(12) United States Patent
Horie et al.

(10) Patent No.: US 10,951,806 B2
(45) Date of Patent: *Mar. 16, 2021

(54) SENSOR SYSTEM, INFORMATION PROCESSING DEVICE, AND SENSOR MANAGEMENT METHOD

(71) Applicant: OMRON Corporation, Kyoto (JP)

(72) Inventors: Masaru Horie, Kusatsu (JP); Masahiro Takayama, Kusatsu (JP)

(73) Assignee: OMRON Corporation, Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/188,285

(22) Filed: Nov. 13, 2018

(65) Prior Publication Data

US 2019/0268527 A1 Aug. 29, 2019

(30) Foreign Application Priority Data

Feb. 23, 2018 (JP) .............................. JP2018-031104

(51) Int. Cl.
*H04N 5/232* (2006.01)
*H04N 5/247* (2006.01)
(Continued)

(52) U.S. Cl.
CPC ......... *H04N 5/23206* (2013.01); *G03B 17/14* (2013.01); *H04N 1/00538* (2013.01);
(Continued)

(58) Field of Classification Search
CPC ........... H04N 5/23206; H04N 1/00538; H04N 5/2256; H04N 5/2257; H04N 5/247;
(Continued)

(56) References Cited

U.S. PATENT DOCUMENTS 7,760,238 B2 * 7/2010 Giesen ................... H04N 5/232
348/211.11
7,915,570 B2 * 3/2011 Cetrulo ................ H04N 5/2354
250/205
(Continued)

FOREIGN PATENT DOCUMENTS

| CN | 106795877 | 5/2017 |
| CN | 107209006 | 9/2017 |

(Continued)

OTHER PUBLICATIONS

"Search Report of Europe Counterpart Application", dated May 20, 2019, p. 1-p. 9.

(Continued)

*Primary Examiner* — Lin Ye
*Assistant Examiner* — Chan T Nguyen
(74) *Attorney, Agent, or Firm* — JCIPRNET

(57) ABSTRACT

The disclosure provides a technique for facilitating management of image sensors having a modular structure. A sensor system includes image sensors and an information processing device connected to the image sensors via a network. Each of the components of each image sensor is provided with a non-volatile memory for storing specific information on the component. The information processing device includes an information acquisition part for acquiring the information stored in the memory of the component constituting the image sensor from each of the image sensors via the network, and a management processing part for performing a predetermined process related to management of the image sensors by using the information acquired by the information acquisition part.

7 Claims, 7 Drawing Sheets

(51) Int. Cl.
   *H04N 7/18*      (2006.01)
   *H04N 17/00*     (2006.01)
   *H04N 1/00*      (2006.01)
   *G03B 17/14*     (2006.01)
   *H04N 5/225*     (2006.01)

(52) U.S. Cl.
   CPC ......... *H04N 5/2256* (2013.01); *H04N 5/2257* (2013.01); *H04N 5/247* (2013.01); *H04N 7/181* (2013.01); *H04N 17/002* (2013.01)

(58) Field of Classification Search
   CPC ...... H04N 7/181; H04N 17/002; G03B 17/14; G03B 2206/00
   USPC ...................................................... 348/207.1
   See application file for complete search history.

(56) References Cited

U.S. PATENT DOCUMENTS

| | | | | |
|---|---|---|---|---|
| 2003/0193571 | A1* | 10/2003 | Schultz | H04N 5/225 348/207.99 |
| 2009/0027509 | A1* | 1/2009 | Giesen | H04N 5/232 348/211.3 |
| 2010/0111489 | A1* | 5/2010 | Presler | H04N 5/232 386/278 |
| 2014/0015669 | A1* | 1/2014 | Arnold | G06Q 30/02 340/539.1 |
| 2014/0125864 | A1* | 5/2014 | Rihn | G06K 9/4661 348/367 |
| 2014/0164725 | A1* | 6/2014 | Jang | G06F 21/84 711/163 |
| 2016/0119617 | A1* | 4/2016 | Sagar | H04N 5/23222 348/187 |
| 2018/0054595 | A1 | 2/2018 | Odamaki et al. | |

FOREIGN PATENT DOCUMENTS

| | | |
|---|---|---|
| JP | H11119318 | 4/1999 |
| JP | 2007214682 | 8/2007 |
| JP | 2010087941 | 4/2010 |

OTHER PUBLICATIONS

"Office Action of China Counterpart Application", dated Jun. 17, 2020, with English translation thereof, pp. 1-16.
"Office Action of Japan Counterpart Application", dated Nov. 17, 2020, with English translation thereof, pp. 1-8.

* cited by examiner

Trouble: Inspection error of XXX
Occurrence date and time:2018/15 10:53:00

Cause analysis
 [Device] Image sensor 005
 [Installation location] Process C of Line B of
  Factory A
 [Cause] Imaging module Influence range:2018/1/15 07:00:00
               ~2018/1/15 11:58:00

Countermeasure: Upgrading the version of
the imaging module of the image sensor 005

| Target device | Target module | Recommended replacement time |
|---|---|---|
| Image sensor 005 | Illumination | 2018/1/15 ~ 2018/2/14 |
| Image sensor 008 | Lens | 2018/1/15 ~ 2018/2/14 |
| Image sensor 009 | Illumination | 2018/1/30 ~ 2018/2/28 |

| Target device | Target module | Recommended maintenance time |
|---|---|---|
| Image sensor 001 | Illumination | 2018/1/15 ~ 2018/1/22 |
| Image sensor 003 | Imaging | 2018/1/18 ~ 2018/1/25 |
| Image sensor 005 | Illumination | 2018/1/19 ~ 2018/1/26 |

SENSOR SYSTEM, INFORMATION PROCESSING DEVICE, AND SENSOR MANAGEMENT METHOD

CROSS REFERENCE TO RELATED APPLICATION

The disclosure claims priority under 35 U.S.C. § 119 to Japanese Application No. 2018-031104 filed Feb. 23, 2018, the entire content of which is incorporated herein by reference.

BACKGROUND

Technical Field

The disclosure relates to a technique for managing image sensors used in factory production lines, etc.

Description of Related Art

In the production line of a factory, a system called image sensor is frequently used for automating the inspection and management of products and saving labor. In the past, the configuration that connects a camera and an image processing device with a cable is common (see Patent Document 1), but recently a processing-integrated image sensor has also been launched which integrates the camera and the image processing device so as to perform from imaging to image processing with a single device. Such a processing-integrated image sensor is also called a "smart camera" and may be formed by integrating illuminations and lenses.

RELATED ART

Patent Document

[Patent Document 1] Japanese Laid-open No. 2007-214682

In order to carry out stable inspection with the image sensor, it is desirable to optimize the model (type), specification and performance of the illuminations, lenses, and imaging elements according to the imaging environment, the object to be inspected, the purposes, etc. Therefore, makers who provide smart cameras have lined up a large number of products such as illuminations, lenses, imaging elements, etc., with the model (type), specification and performance changed little by little, for the user to select the one with the optimum specification.

However, as the IoT (Internet of Things) development of factories is accelerating, the range of application of smart cameras has expanded, and it is becoming difficult to provide product variations that cover the diverse user needs. Further, in order to be distinguished from the competitors in product competition, more mass customization and seasonal products are offered to meet the preference of each customer and the life cycle of the products of digital devices typified by smart phones is shortening, and there is an increasing need for partially changing the illuminations and lenses, etc. so that change of the object to be inspected enters a short cycle to be optimum for the inspection. Thus, in the recent years, the so-called modular structure smart camera has been introduced, which respectively modularizes the illuminations, lenses, and imaging elements for the user to freely combine the illuminations, lenses, and imaging elements. For example, if the maker provides five types of illumination modules, lens modules, and imaging element modules, there are 125 possible combinations, from which the user can select a combination that matches the required specification.

The modular structure has the merits of reducing product variations for the makers and increasing choices and flexibility for the user. On the other hand, the following demerits raise concerns. In the past, managing the equipment in units of the image sensor is sufficient to deal with the trouble and maintenance in the factory. However, when the image sensor having a modular structure is introduced, each image sensor may be composed of any combination of modules and it is foreseeable that there will be a higher demand for grasping details of the respective modules (date of production, time of introduction, time of use, history of diversion from other equipment, detailed specification, etc.), and management, maintenance and preservation of the equipment may be complicated. Usually a large number of image sensors are installed in the factory (for example, when it comes to a large-scale factory, the number may be up to several hundreds to several thousands). Therefore, it increases the trouble in management, maintenance and preservation, which is a serious problem.

The disclosure has been made in view of the above and provides a technique for facilitating management of image sensors having a modular structure.

SUMMARY

A first aspect of the disclosure provides a sensor system including a plurality of image sensors and an information processing device connected to the plurality of image sensors via a network. The image sensor is a modular image sensor configured by combining a plurality of modularized components. Each of the plurality of components includes a non-volatile memory for storing specific information related to the component. The information processing device includes an information acquisition part for acquiring the information stored in the non-volatile memory of the component constituting the image sensor from each of the plurality of image sensors via the network, and a management processing part for performing a predetermined process related to management of the plurality of image sensors by using the information acquired by the information acquisition part.

DESCRIPTION OF THE EMBODIMENTS

Application Example

Figure 1:
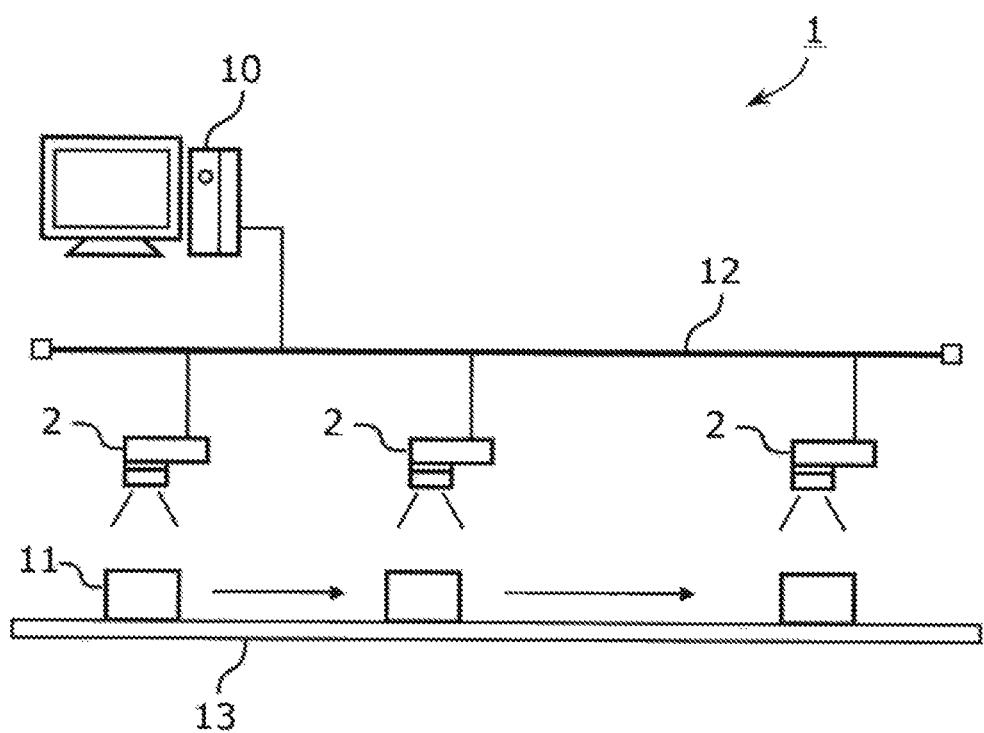
FIG. 1 is a diagram schematically showing an example of the overall configuration of a sensor system.
Figure 2A:
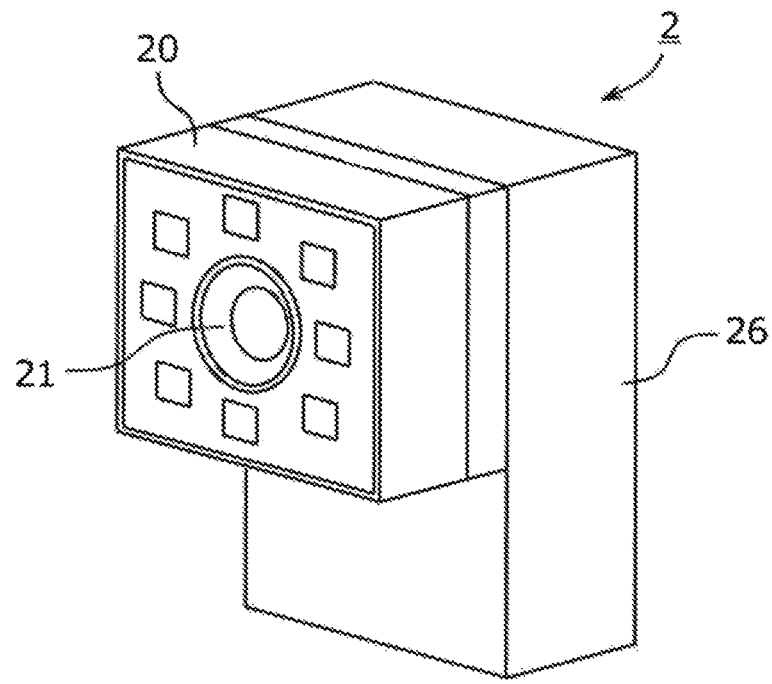
FIG. 2(A) is a perspective view schematically showing the appearance of the image sensor and FIG. 2(B) is a perspective view schematically showing a state where the image sensor is disassembled.
Figure 2B:
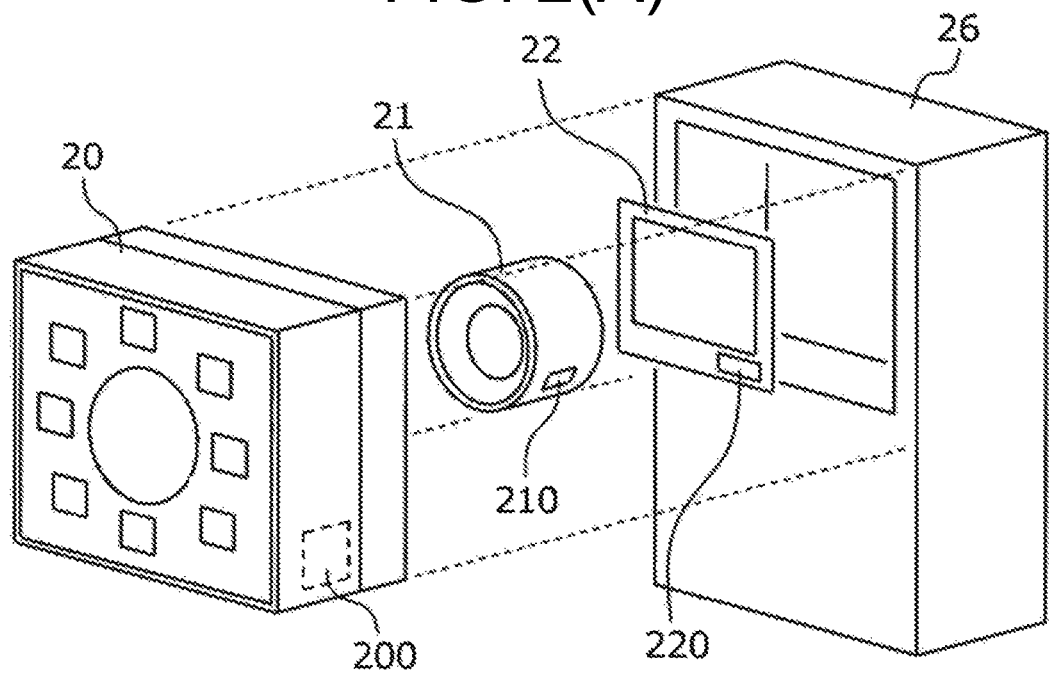

First, an example of the scene to which the disclosure is applied will be described. FIG. 1 shows an example of the overall configuration of a sensor system according to an embodiment of the disclosure. FIG. 2(A) and FIG. 2(B) schematically show an example of an image sensor according to an embodiment of the disclosure.

A sensor system 1 of the present embodiment is a system for inspecting and managing a product 11 on a production line, etc. and includes a plurality of image sensors 2 and an information processing device 10. The information processing device 10 is connected to the image sensors 2 via an industrial network 12 such as EtherCAT and may transmit and receive data via the network 12 to/from each of the image sensors 2. In the example of FIG. 1, three image sensors 2 are installed for imaging the product 11 flowing on a conveyor 13. However, the number of the image sensors 2 is not limited to three, and in a large factory, there may be several tens to hundreds or more image sensors in some cases.

The image sensor 2 of the present embodiment is a processing-integrated image sensor having a so-called modular structure. An illumination part 20, a lens part 21, and an imaging part 22, which are components of the imaging system, are modularized respectively and the user can combine the respective modules as desired according to the purposes, etc. of the image sensor 2. Each module (i.e., the illumination part 20, the lens part 21, and the imaging part 22) is provided with a non-volatile memory 200, 210, or 220 for storing specific information related to the module. The specific information related to the module may, for example, include one or more of the following: information for specifying the format of the module, information for specifying the individual of the module, information indicating the specification of the module, information indicating the performance of the module, information indicating the function of the module, information for determining the replacement time and the maintenance time of the module, etc.

The information processing device 10 may acquire the information stored in the memories 200, 210, and 220 of the modules from the plurality of image sensors 2 respectively via the network 12. The information processing device 10 may then use the acquired information to manage the plurality of image sensors 2.

In this way, the non-volatile memory is provided for each module, and the specific information related to the module can be stored therein and referred to therefrom, so the information processing device 10 can accurately and easily collect the module configurations and details of the plurality of image sensors 2 installed in the production line. Therefore, it is possible to facilitate the management (including operation, maintenance, and preservation) of the image sensors 2 having the modular structure.

<Configuration of the Image Sensor>

Figure 3:
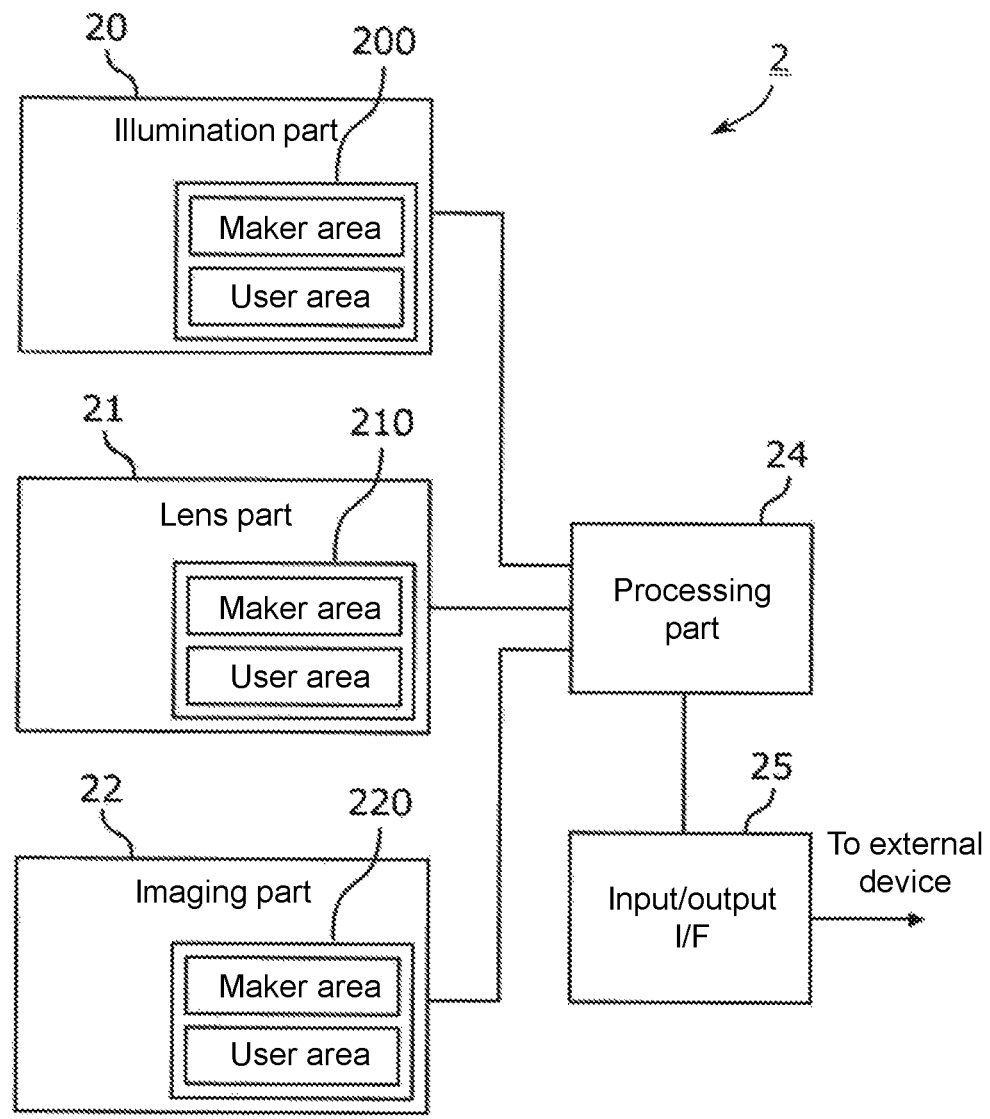
FIG. 3 is a block diagram schematically showing the configuration of the image sensor.

The image sensor according to an embodiment of the disclosure will be described with reference to FIG. 2(A), FIG. 2(B), and FIG. 3. FIG. 2(A) is a perspective view schematically showing the appearance of the image sensor and FIG. 2(B) is a perspective view schematically showing a state where the image sensor is disassembled. FIG. 3 is a block diagram schematically showing the configuration of the image sensor.

The image sensor 2 is a device installed in a production line of a factory, for example, and used for various processes using images. The image sensor 2 is also called a vision sensor or a vision system. The image sensor 2 of the present embodiment is a processing-integrated image sensor (the so-called smart camera) formed by integrating an imaging system and a processing system.

The image sensor 2 includes the illumination part 20, the lens part 21, and the imaging part 22 as the imaging system. The illumination part 20 is a device for illuminating a subject (an object to be inspected, etc.) within a field of view of the image sensor 2 and is composed of a plurality of light emitting elements (LEDs, etc.) arranged around the lens part 21, for example. The lens part 21 is an optical system for forming an optical image of the subject on the imaging part 22. For example, an optical system having functions such as focus adjustment, aperture, zoom, etc. is used. The imaging part 22 is a device for generating and outputting image data through photoelectric conversion and is composed of imaging elements such as CCD and CMOS, for example.

The image sensor 2 further includes a processing part 24 and an input/output interface (input/output I/F) 25 as the processing system. The processing part 24 is a device for performing image processing (for example, preprocessing, feature amount extraction, etc.) on the image data taken from the imaging system, various processes based on the result of the image processing (for example, inspection, character recognition, individual identification, etc.), data transmission/reception with an external device via the input/output interface 25, generation of data to be outputted to the external device, processing of data received from the external device, control of the imaging system and the input/output interface 25, etc. The processing part 24 is composed of a processor and a memory, for example, and the processor reads and executes programs stored in the memory so as to realize the various processes described above. A part or all of the functions of the processing part 24 may be realized by an ASIC (Application Specific integrated Circuit), an FPGA (Field Programmable Gate Array), etc. or may be provided by the external device. The input/output interface 25 is a communication interface for transmitting/receiving data to/from the external device. For example, the input/output interface 25 includes a network interface for connecting to a PLC (Programmable Logic Controller) or the information processing device 10, a parallel interface for connecting to another sensor or controller, etc.

The image sensor 2 of the present embodiment has a modular structure in which, as shown in FIG. 2(B), the three modules, i.e., the illumination part 20, the lens part 21, and the imaging part 22, are selected and attached to a sensor body 26. Regarding the illumination part, it is also possible to use it without selecting it. Each of the modules is fixed to the sensor body 26 by screw fastening, for example, and the user can attach/detach the module freely.

Multiple types of modules are prepared to serve as the illumination part (illumination module) 20, such as modules with illumination lights of different wavelengths like white illumination/red illumination/infrared light illumination, and modules with different light emitting element arrangements, light quantities, or light emitting patterns. Further, multiple types of light sources (LEDs, etc.) such as red, blue, green, and infrared light sources are provided in one module, and an illumination module that is capable of irradiating lights of wavelengths (for example, white, violet, pink, etc.) other than red, blue, green, and infrared through control of light emission of each light source may also be used. This type of illumination is called multi-color illumination, etc. Multiple types of modules are prepared to serve as the lens part (lens module) 21, such as a module having a function of adjusting the focus manually or automatically with use of an actuator, etc., a module with different fields of view such as a narrow field of view/a wide field of view, and a module having a zoom function. Multiple types of modules are prepared to serve as the imaging part 22, such as modules having different numbers of pixels, frame rates, and shutter types (rolling shutter/global shutter). The user can combine proper modules as appropriate according to the purpose or the required specification of the image sensor 2.

A non-volatile memory is incorporated in each module. Specifically, as shown in FIG. 3, an illumination module memory 200 is incorporated in the illumination part 20, a lens module memory 210 is incorporated in the lens part 21, and an imaging module memory 220 is incorporated in the imaging part 22. Hereinafter, these are collectively referred to as "module memory". For example, EPROM (Electrically Programmable Read Only Memory), EEPROM (Electrically Erasable Programmable Read Only Memory), FeRAM (Ferroelectric Random Access Memory), MRAM (Magnetoresistive Random-Access Memory), etc. can be used as the module memory, and the module memory may have any data capacity. In the present embodiment, an EEPROM having a capacity of several kilobytes to several tens of megabytes is used.

In the module memory, two writing areas, i.e., "maker area" and "user area", are provided. The maker area is an area for the maker to write module default data. The user can read the data in the maker area but cannot rewrite or delete the data in the maker area. For example, format information (format name, format number, etc.) and individual information (serial number, lot number, hardware version, etc.) of the module are stored in the maker area. In addition, setting values and correction parameters during driving of the module, and individual variation information of the module (for example, data measured by factory shipment inspection) may be stored in the module memory. For example, in the case of the illumination part, the illumination control setting values (control type, voltage, duty, delay, block lighting method, etc.), variation in brightness and color tone of each light source, optical axis information, etc. may be stored. In the case of the lens part, lens/focus setting values (focus initial reference value, etc.), presence/absence of AF (auto focus) function, focal length, angle of view, F number (focal ratio), distortion amount, optical axis information, etc. may be stored. Further, in the case of the imaging part, camera setting values (setting initial value of the imaging element, etc.), pixel defect correction, vertical stripe correction data, white balance initial value, etc. may be stored. In contrast, the user area is an area that the user can rewrite. The user can freely use the user area. For example, any information may be stored therein, such as the information that specifies the location (factory, production line) where the image sensor is installed, information on the purchase date and maintenance date of the module, status of use of the module, etc. Nevertheless, the above is merely an example, and any data that is useful information for management and operation of the image sensor 2 may be stored in the module memory.

The image sensor 2 can be used for various purposes. For example, the image sensor 2 can be used for recording the image of the object under inspection, recognizing the shape, detecting the edge, measuring the width and the number, measuring the area, acquiring color features, labeling and segmentation, object recognition, reading bar codes and two-dimensional codes, OCR (Optical Character Recognition), individual identification, etc. FIG. 1 shows an example of imaging the product 11 flowing on the conveyor 13 with the image sensor 2 and inspecting the appearance of the product 11.

<Configuration of the Information Processing Device>

Figure 4:
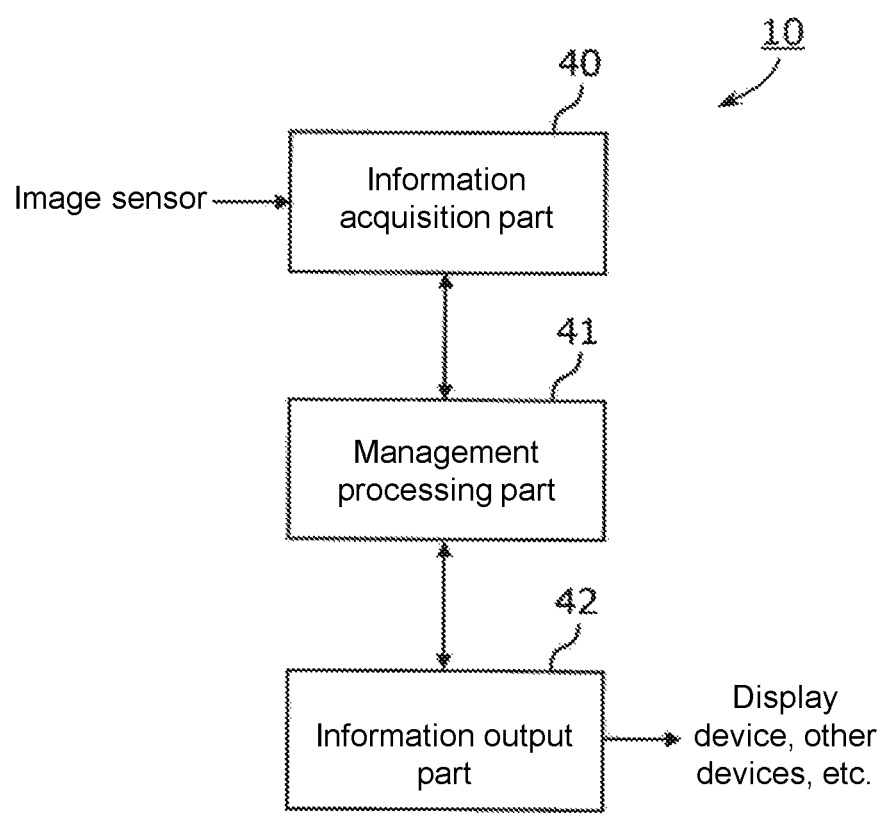
FIG. 4 is a block diagram schematically showing the configuration of the information processing device.

FIG. 4 schematically shows the configuration of the information processing device 10.

The information processing device 10 is a management device for managing the image sensors 2 and includes an information acquisition part 40, a management processing part 41, and an information output part 42 as the main configuration. The information acquisition part 40 performs a process of acquiring the information stored in the module memory of each module constituting the image sensor 2 from the image sensors 2 existing on the network via the network. The information acquisition part 40 may acquire the information in the module memory all at once or may selectively acquire only the necessary information. The management processing part 41 performs a predetermined process (hereinafter referred to as "management process") related to management of the plurality of image sensors 2 by using the information acquired by the information acquisition part 40. The information output part 42 performs a process of outputting the information obtained by the management process performed by the management processing part 41. The information output part 42 may display information on a display device, transmit information to other devices (PLC, controller, sensor, actuator, production equipment, etc.) on the production line via the network, notify a message, etc. to a user terminal (for example, a terminal of a manager or maintainer of a production line) via the network, or transmit information to another computer or a cloud via the network. Specific examples of the process of the information processing device 10 will be described later.

The above-described information processing device 10 is realized, for example, by installing necessary programs to a computer having a CPU (Central Processing Unit) (processor), a main storage device (memory), an auxiliary storage device (mass storage with a hard disk, a solid state hard disk drive, etc.), a communication interface (communication I/F), an input device (a keyboard, a pointing device, etc.), a display device, etc. In this case, the information acquisition part 40, the management processing part 41, and the information output part 42 described above are realized by developing and executing, by the CPU, the programs stored in the auxiliary storage device in the main storage device. Some or all of the functions provided by the information processing device 10 may also be realized by circuits such as ASIC, FPGA, etc. Alternatively, some of the functions may be distributed and processed by other computers or executed by a cloud server.

<Example of the Management Process Using the Module Memory>

In the image sensor 2 of the present embodiment, since each of the modules (components) has a non-volatile memory, the specific information, etc. related to each module can be stored in the memory of the module itself, which makes it possible to handle the module (hardware) and the specific information thereof (software) in a linked manner. By referring to the information in the memory of each module, the processing part 24 of the image sensor 2 and the information processing device 10 can easily acquire accurate information on the modules attached to the image sensor 2 through software. Therefore, it is possible to facilitate management (including operation, maintenance, and preservation) of many image sensors 2 existing in the production line. Hereinafter, some management processes using the module memory will be exemplified.

(1) Collection of the Module Configuration

Figure 5:
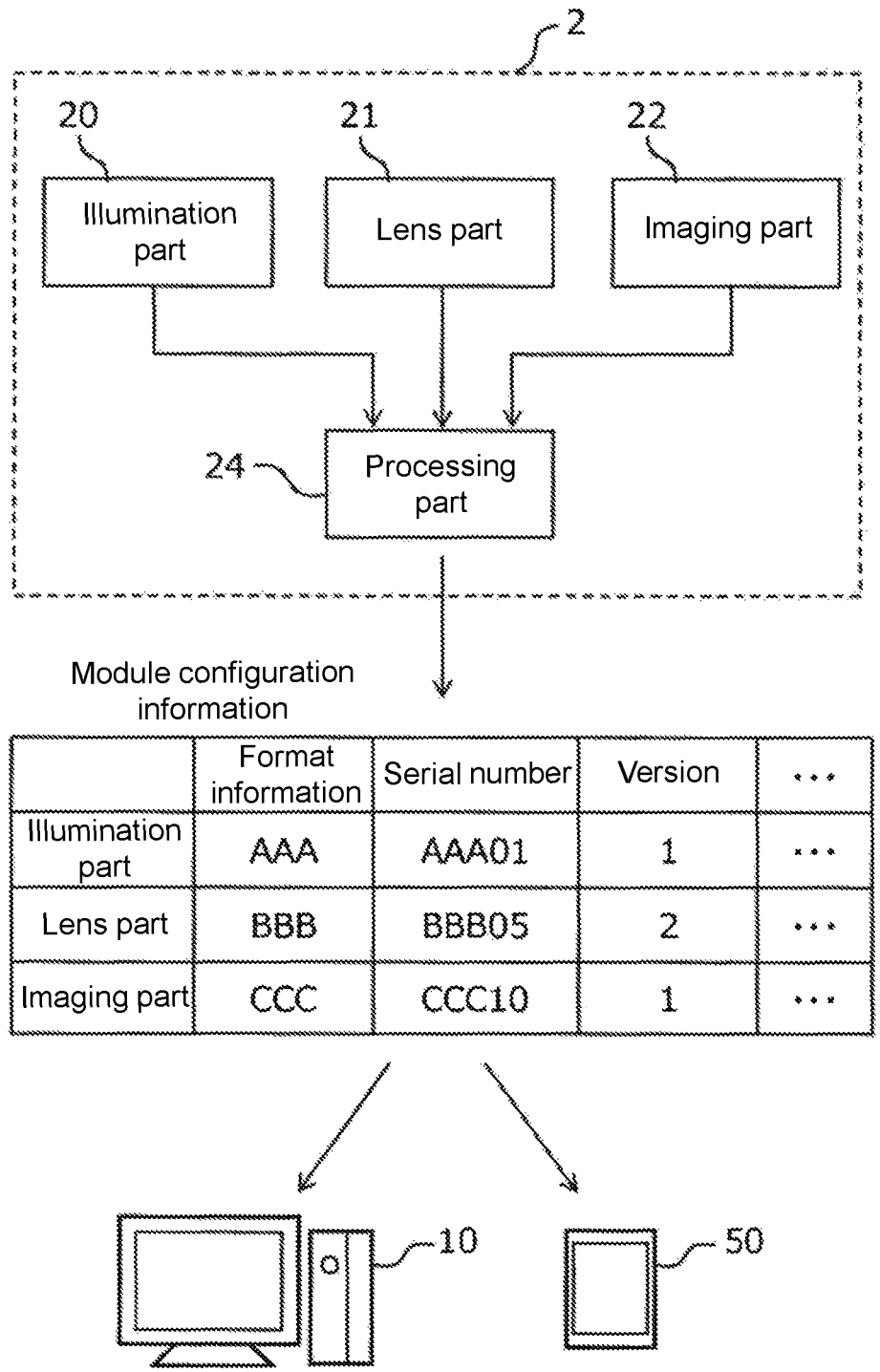
FIG. 5 is a diagram showing an example of collection of the module configuration information.

As shown in FIG. 5, upon start-up of the image sensor 2 or in response to a request from the information processing device 10 or a user terminal 50, the processing part 24 reads information respectively from the memory 200 of the illumination part 20, the memory 210 of the lens part 21, and the memory 220 of the imaging part 22, and based on the information, generates module configuration information representing the combination of the modules attached to the sensor body 26 and records it in the memory in the processing part 24. The processing part 24 sends the module configuration information to the information processing device 10 or the user terminal 50 spontaneously (periodically) or in response to a request from the information processing device 10 or the user terminal 50. Alternatively, if the image sensor 2 has a display, the processing part 24 may display the module configuration information on the display.

The user terminal 50 is a portable computer used by a user (equipment manager, maintainer, etc.) and can communicate with the image sensor 2 via the network (or directly via short-range wireless communication, etc.). For example, a mobile PC, a smartphone, a tablet terminal, a wearable terminal, etc. may be used as the user terminal 50.

By using the function of collecting the module configuration described above, the user can easily collect and grasp the module configuration of the image sensor 2 in operation. In addition, it is easy for the information processing device 10 to automatically collect the module configuration information of many image sensors 2 installed in the production line or factory and manage them unitarily. Such a function is more useful as the number of the image sensors 2 installed increases and as the variation in the module configurations of the image sensors installed in the production line or the factory increases.

(2) Cause Identification at the Time when Trouble Occurs

It is assumed that the image sensors 2 with various module configurations are mixed on the production line. In the past, because it was difficult to grasp and manage the configurations of the image sensors and the locations where they are installed in the production line, when some trouble (errors in the image sensor and the production device, occurrence of defective products, etc.) occurred, there was no way other than specifying the problematic device by intensive human labor, such as visually checking the module configuration of the image sensor and the format, version, etc. of each module one by one.

Figures 6, 7:
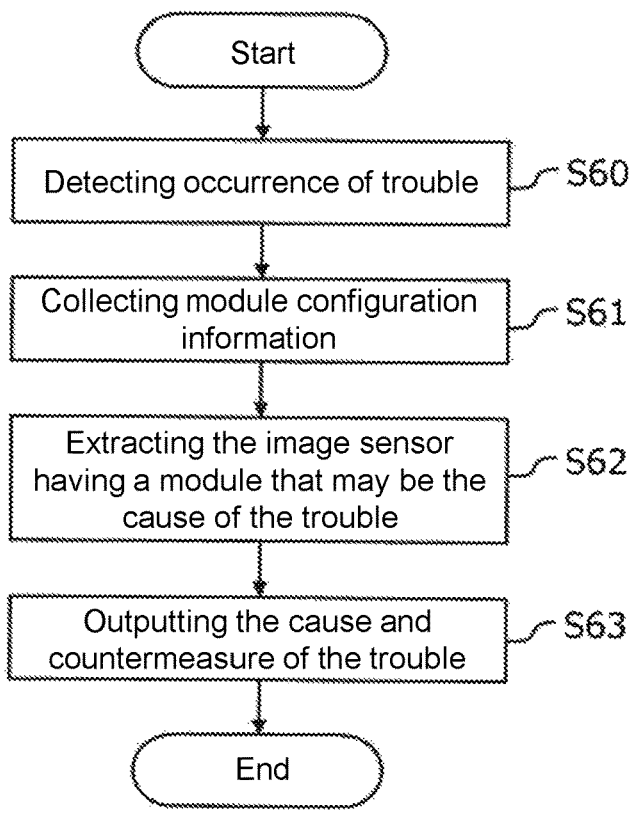
FIG. 6 is a diagram showing an example of a cause identification process at the time when trouble occurs.
FIG. 7 is a diagram showing an example of an output of a cause and a countermeasure of the trouble.

Therefore, the sensor system 1 of the present embodiment provides a function to support cause identification at the time when trouble occurs. FIG. 6 is an example of a cause identification process performed by the information processing device 10 at the time when trouble occurs, and FIG. 7 is an example of a cause and a countermeasure of the trouble outputted by the information processing device 10.

In step S60, the management processing part 41 of the information processing device 10 detects occurrence of trouble in the production line. For example, the management processing part 41 may detect occurrence of trouble by receiving an error signal from a production device or an inspection device installed in the production line, receiving the user's operation on a trouble notification button, etc., for example.

In step S61, the information acquisition part 40 of the information processing device 10 acquires module configuration information from all of the image sensors 2 installed in the production line where the trouble occurs. The method of acquiring the module configuration information is as described above. In the case that the information processing device 10 already stores the module configuration information acquired in the past in the database, the module configuration information may be read from the database instead of being acquired from the process of step S61.

In step S62, the management processing part 41 of the information processing device 10 checks the format, version, date of production, etc. of the modules of each of the image sensors 2 by using the module configuration information collected in step S61. For example, any of the following may cause trouble: the format of the module is inappropriate, the version of the module is old, the module is old and has reached its lifetime, etc. The management processing part 41 specifies the image sensor having a module that may be the cause of the trouble based on the content of the trouble that has occurred and the format, version, date of production, etc. of each of the modules. At this time, not only one image sensor but also a plurality of image sensors likely to be problematic may be extracted.

In step S63, the information output part 42 of the information processing device 10 outputs the cause and a countermeasure of the trouble. In the example of FIG. 7, the content of the trouble, the occurrence date and time, the image sensor and the module considered as the cause of the trouble and their installation locations, the influence range of the trouble, and the countermeasure are outputted. By providing such information, the user can promptly investigate the cause and plan countermeasures.

(3) Maintenance

It is assumed that the image sensors 2 with different times of introduction and maintenance timings are mixed on the production line. In such a case, it not only takes a great deal of time and effort to record and manage the times of introduction and the times of maintenance for each module, but there is also the possibility of a human error such as a recording mistake. Consequently, it was difficult to perform planned maintenance in the past, and one could only perform post-maintenance, i.e., performing maintenance after trouble occurred in the image sensor.

Figures 8, 9A, 9B:
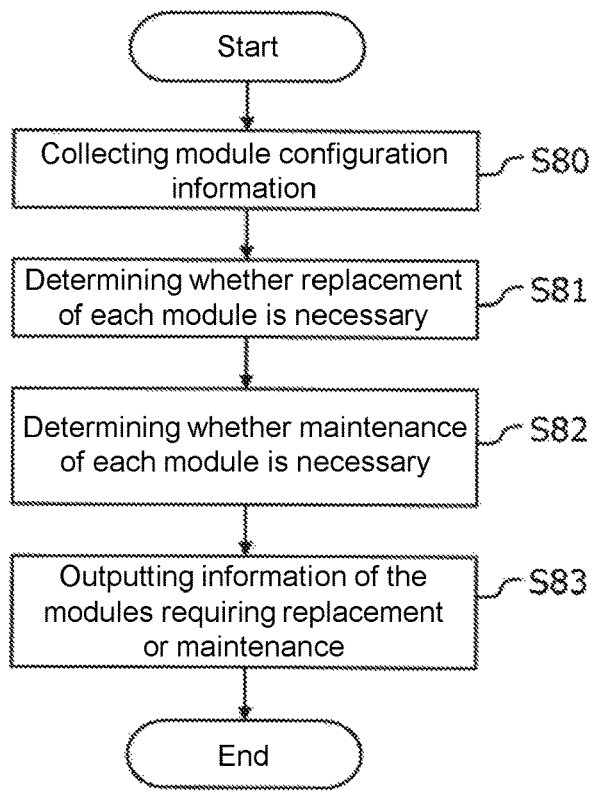
FIG. 8 is a diagram showing an example of a maintenance process.
FIG. 9(A) and FIG. 9(B) are diagrams showing examples of outputs of the maintenance process.

Therefore, the sensor system 1 of the present embodiment provides a function to support module replacement and maintenance. FIG. 8 is an example of a maintenance process performed by the information processing device 10, and FIG. 9(A) and FIG. 9(B) are examples of notifications outputted by the information processing device 10.

In step S80, the information acquisition part 40 of the information processing device 10 acquires module configuration information from all of the image sensors 2 installed in the production line. The method of acquiring the module configuration information is as described above. In the case that the information processing device 10 already stores the module configuration information acquired in the past in the database, the module configuration information may be read from the database instead of being acquired from the process of step S80.

In step S81, the management processing part 41 of the information processing device 10 checks the format, the date of production, the status of use, etc. of the modules of each of the image sensors 2 by using the module configuration information collected in step S80. The management processing part 41 predicts deterioration and lifetime of each module based on the format, the date of production, the status of use, etc. of each module, and determines whether replacement of each module is necessary. In the present embodiment, the modules that require replacement within one month are extracted.

In step S82, the management processing part 41 of the information processing device 10 checks the format, the maintenance history (for example, the last inspection date and calibration date), the status of use, etc. of the modules of each of the image sensors 2 by using the module configuration information collected in step S80. The management processing part 41 determines whether maintenance of each module is necessary based on the format, the maintenance history, the status of use, etc. of each module. In the present embodiment, modules that require maintenance within two weeks are extracted.

In step S83, the information output part 42 of the information processing device 10 generates a list of the image sensors and modules determined to require replacement in step S81 and a list of the image sensors and modules determined to require maintenance in step S82 and outputs the lists to the display device. In the examples of FIG. 9(A) and FIG. 9(B), the target image sensors and modules and the recommended times of replacement and maintenance are outputted. With such information provided, the user can perform replacement and maintenance of the image sensors in a planned manner.

<Others>

Nevertheless, the above embodiment merely exemplifies a configuration example of the disclosure. The disclosure is not limited to the specific forms described above, and it is possible to make various modifications within the scope of the technical idea of the disclosure. For example, although the above embodiment illustrates an example that the three modules are the illumination part, the lens part, and the imaging part, the components to be attached to the image sensor are not limited thereto. For example, an optical filter, the input/output interface, the processing part (processor or memory), the display, etc. may also be modularized. Also, any information may be stored in the module memory. For example, information such as the date of production, the purchase date, the use start date, the status of use (time of use, operating time, etc.), the recommended replacement time, etc. of the module may be used as the information for determining the replacement time of the module. Moreover, information such as the date of production, the purchase date, the use start date, the maintenance history (last inspection date, calibration date, etc.), the status of use (time of use, operating time, etc.) of the module, for example, may be used as the information for determining the maintenance time. Regarding the forms in which the smart camera is provided (delivery forms), the modules may be provided separately to be assembled on the user side, or the smart camera may be provided with the illumination module and the lens module incorporated in the sensor body. In the case of the latter form, there is no need to adjust the optical conditions on the user side, so it has the advantage that the image sensor can be introduced more easily.

According to this configuration, since each of the components is provided with a non-volatile memory and specific information related to the component is stored in the memory, it is possible to handle the component (hardware) and the specific information thereof (software) in a linked manner. Since the information processing device is configured to be able to acquire information from each of the image sensors via the network, it is easy to collect accurate information on each component of each of the plurality of image sensors existing on the network. Therefore, it is possible to facilitate management (including operation, maintenance, and preservation) of the image sensors having a modular structure.

The information acquisition part may acquire at least information for specifying a format of the component constituting the image sensor. By referring to such information, the information processing device can accurately and easily specify the format (type) of each component constituting the image sensor. For example, a format name and a format number on a catalog, information obtained by encoding them, etc. may be used as the information for specifying the format.

The information acquisition part may acquire at least information for specifying an individual of the component constituting the image sensor. By referring to such information, the information processing device can accurately and easily specify the individual of each component constituting the image sensor. For example, a serial number and a lot number of a product, information obtained by encoding them, etc. may be used as the information for specifying the individual.

The information acquisition part may acquire at least information indicating at least one of a specification, a performance, and a function of the component constituting the image sensor. By referring to such information, the information processing device can accurately and easily specify the specification, the performance, the function, etc. of each component constituting the image sensor.

The information acquisition part may acquire at least information for determining a replacement time of the component constituting the image sensor. By referring to such information, the information processing device can appropriately and easily determine whether replacement of the image sensor and/or the individual component is necessary and the replacement time. For example, information such as the date of production, the purchase date, the use start date, the status of use (time of use, operating time), the recommended replacement time, etc. of the product may be used as the information for determining the replacement time of the component.

The information acquisition part may acquire at least information for determining a maintenance time of the component constituting the image sensor. By referring to such information, the information processing device can appropriately and easily determine whether maintenance of the image sensor and/or the individual component is necessary and the maintenance time. For example, information such as the date of production, the purchase date, the use start date, the maintenance history (last maintenance date, etc.), the status of use (time of use, operating time), etc. of the product may be used as the information for determining the maintenance time. Maintenance includes replacement, adjustment, repair of hardware, and update/adjustment of software (also referred to as calibration).

The predetermined process may include a process of collecting combinations of the components of each of the plurality of image sensors. Further, the predetermined process may include a process of extracting the image sensor having a component that is likely to have a problem from the plurality of image sensors. In addition, the predetermined process may include a process of determining whether replacement and/or maintenance of the component of the plurality of image sensors is necessary.

The plurality of components may include an illumination part for illuminating a subject, a lens part for forming an optical image of the subject, and an imaging part for generating an image based on the optical image. By changing the combination of the illumination part, the lens part, and the imaging part, it is possible to configure the image sensors of various specifications.

A second aspect of the disclosure provides an information processing device connected to a plurality of image sensors via a network. The image sensor is a modular image sensor configured by combining a plurality of modularized components. Each of the plurality of components includes a non-volatile memory for storing specific information related to the component. The information processing device includes an information acquisition part for acquiring the information stored in the non-volatile memory of the component constituting the image sensor from each of the plurality of image sensors via the network, and a management processing part for performing a predetermined process related to management of the plurality of image sensors by using the information acquired by the information acquisition part.

According to this configuration, since the information processing device is configured so that information can be acquired from each of the image sensors via the network, it is easy to collect accurate information on each component of each of the plurality of image sensors existing on the network. Therefore, it is possible to facilitate the management (including operation, maintenance, and preservation) of the image sensors having the modular structure.

A third aspect of the disclosure provides a sensor management method for managing a plurality of image sensors by an information processing device in a production line provided with a plurality of modular image sensors configured by combining a plurality of modularized components. Each of the plurality of components of each image sensor is provided with a non-volatile memory for storing specific information related to the component. The sensor management method includes:

acquiring the information stored in the non-volatile memory of the component constituting the image sensor from each of the plurality of image sensors via a network by the information processing device; and performing a predetermined process related to management of the plurality of image sensors by using the information acquired from the plurality of image sensors by the information processing device.

According to this configuration, since accurate information on the components of each of the plurality of image sensors provided in the production line can be easily collected by the information processing device, it is possible to facilitate management (including operation, maintenance, and preservation) of the image sensors having a modular structure.

According to the disclosure, it is possible to provide a technique for facilitating management of image sensors having a modular structure.

APPENDIX (1) A sensor system (1) including a plurality of image sensors (2) and an information processing device (10) connected to the plurality of image sensors (2) via a network (12), wherein
the image sensor (2) is a modular image sensor configured by combining a plurality of modularized components (20, 21, 22),
each of the plurality of components (20, 21, 22) includes a non-volatile memory (200, 210, 220) for storing specific information related to the component, and
the information processing device (10) includes:
an information acquisition part (40) for acquiring the information stored in the memory (200, 210, 220) of the component (20, 21, 22) constituting the image sensor (2) from each of the plurality of image sensors (2) via the network (12); and
a management processing part (41) for performing a predetermined process related to management of the plurality of image sensors (2) by using the information acquired by the information acquisition part (40).

(2) An information processing device (10) connected to a plurality of image sensors (2) via a network (12), wherein
the image sensor (2) is a modular image sensor configured by combining a plurality of modularized components (20, 21, 22),
each of the plurality of components (20, 21, 22) includes a non-volatile memory (200, 210, 220) for storing specific information related to the component, and
the information processing device (10) includes:
an information acquisition part (40) for acquiring the info nation stored in the memory (200, 210, 220) of the component (20, 21, 22) constituting the image sensor (2) from each of the plurality of image sensors (2) via the network (12); and
a management processing part (41) for performing a predetermined process related to management of the plurality of image sensors (2) by using the information acquired by the information acquisition part (40).

(3) A sensor management method for managing a plurality of image sensors (2) by an information processing device (10) in a production line provided with a plurality of modular image sensors (2) configured by combining a plurality of modularized components (20, 21, 22), wherein
each of the plurality of components (20, 21, 22) of each image sensor (2) is provided with a non-volatile memory (200, 210, 220) for storing specific information related to the component, and the sensor management method includes:
acquiring the information stored in the memory (200, 210, 220) of the component (20, 21, 22) constituting the image sensor from each of the plurality of image sensors (2) via a network (12) by the information processing device (10), and
performing a predetermined process related to management of the plurality of image sensors (2) by using the information acquired from the plurality of image sensors (2) by the information processing device (10).

What is claimed is:

1. A sensor system comprising a plurality of image sensors and an information processing device connected to the plurality of image sensors via a network, wherein
each of the plurality of image sensors is a modular image sensor configured by combining a plurality of components which are modularized,
each of the plurality of components comprises a non-volatile memory, wherein specific information related to each of the plurality of components is stored in each non-volatile memory, and
the information processing device comprises a processor configured to:
acquire the specific information stored in the non-volatile memory of the component constituting the image sensor from each of the plurality of image sensors via the network, the specific information includes at least one of information for specifying a format of the component, information for specifying an individual of the component, information indicating a specification of the component, information indicating a performance of the component, information indicating a function of the component, and information for determining a replacement time and a maintenance time of the component; and perform a predetermined process related to management of the plurality of image sensors by using the specific information that are acquired, wherein the management of the plurality of image sensors comprises operation, maintenance, and preservation of the plurality of image sensors.

2. The sensor system according to claim 1, wherein the predetermined process comprises a process of collecting combinations of the components of each of the plurality of image sensors.

3. The sensor system according to claim 1, wherein the predetermined process comprises a process of extracting the image sensor having a component that is likely to have a problem from the plurality of image sensors.

4. The sensor system according to claim 1, wherein the predetermined process comprises a process of determining whether replacement and/or maintenance of the component of the plurality of image sensors is necessary.

5. The sensor system according to claim 1, wherein the plurality of components comprise an illuminating device for illuminating a subject, a lens part for forming an optical image of the subject, and an imaging device for generating an image based on the optical image.

6. An information processing device connected to a plurality of image sensors via a network, wherein each of the plurality of image sensors is a modular image sensor configured by combining a plurality of components which are modularized, each of the plurality of components comprises a non-volatile memory, wherein specific information related to each of the plurality of components is stored in each non-volatile memory, and the information processing device comprises a processor configured to:

acquire the specific information stored in the non-volatile memory of the component constituting the image sensor from each of the plurality of image sensors via the network, the specific information includes at least one of information for specifying a format of the component, information for specifying an individual of the component, information indicating a specification of the component, information indicating a performance of the component, information indicating a function of the component, and information for determining a replacement time and a maintenance time of the component; and perform a predetermined process related to management of the plurality of image sensors by using the specific information that are acquired, wherein the management of the plurality of image sensors comprises operation, maintenance, and preservation of the plurality of image sensors.

7. A sensor management method for managing a plurality of image sensors by an information processing device in a production line provided with a plurality of modular image sensors configured by combining a plurality of components which are modularized, wherein each of the plurality of components of each of the plurality of image sensors is provided with a non-volatile memory, wherein specific information related to each of the plurality of components is stored in each non-volatile memory, and the sensor management method comprises:

acquiring the specific information stored in the non-volatile memory of the component constituting the image sensor from each of the plurality of image sensors via a network by the information processing device, the specific information includes at least one of information for specifying a format of the component, information for specifying an individual of the component, information indicating a specification of the component, information indicating a performance of the component, information indicating a function of the component, and information for determining a replacement time and a maintenance time of the component, and performing a predetermined process related to management of the plurality of image sensors by using the specific information acquired from the plurality of image sensors by the information processing device, wherein the management of the plurality of image sensors comprises operation, maintenance, and preservation of the plurality of image sensors.

* * * * *